Jan. 19, 1960
F. BAKER
2,921,684
WHIRLPOOL SEPARATOR
Filed Oct. 27, 1955
2 Sheets-Sheet 1
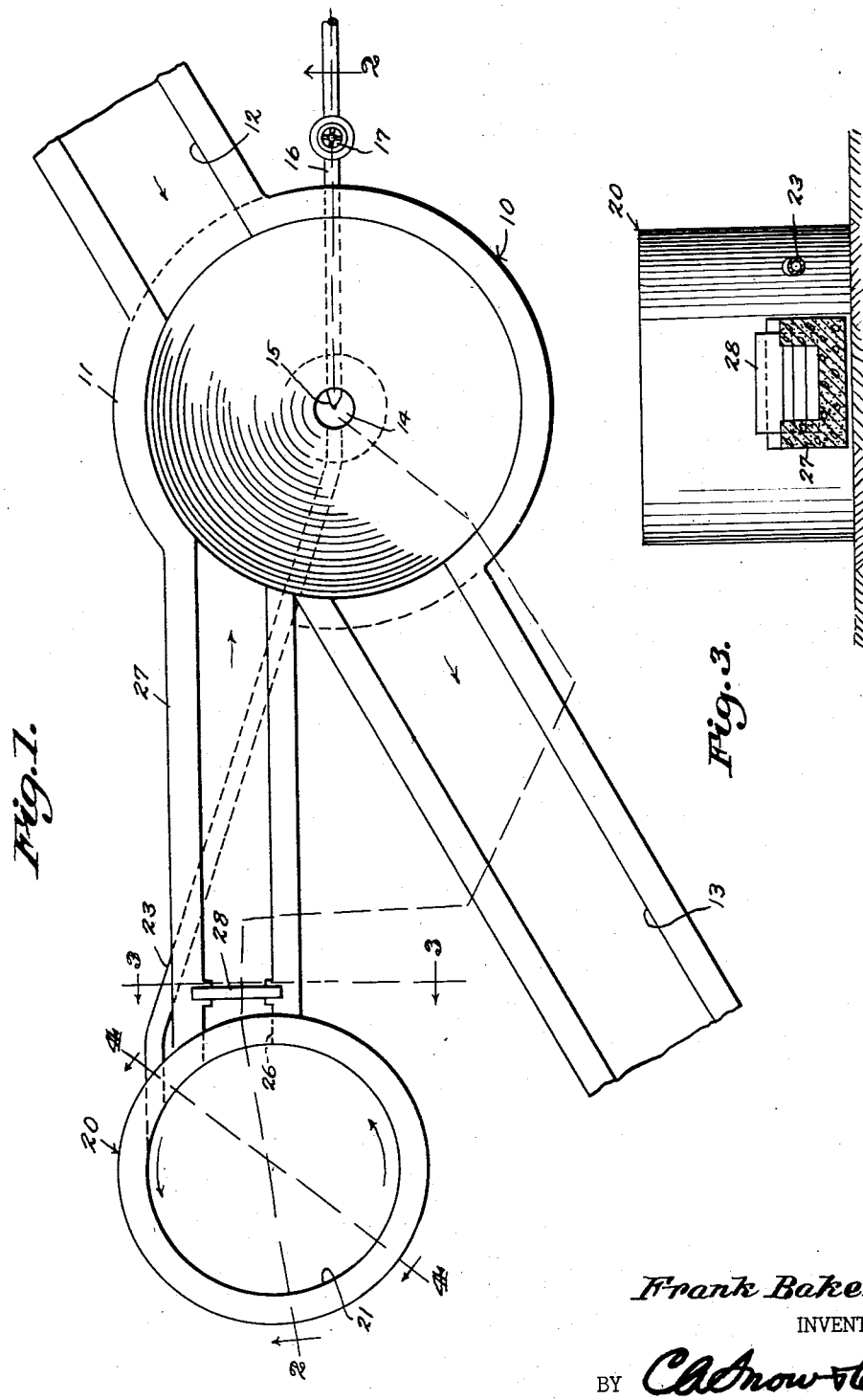
Frank Baker
INVENTOR
BY *Knowles*
ATTORNEYS.

Jan. 19, 1960  F. BAKER  2,921,684
WHIRLPOOL SEPARATOR
Filed Oct. 27, 1955  2 Sheets-Sheet 2
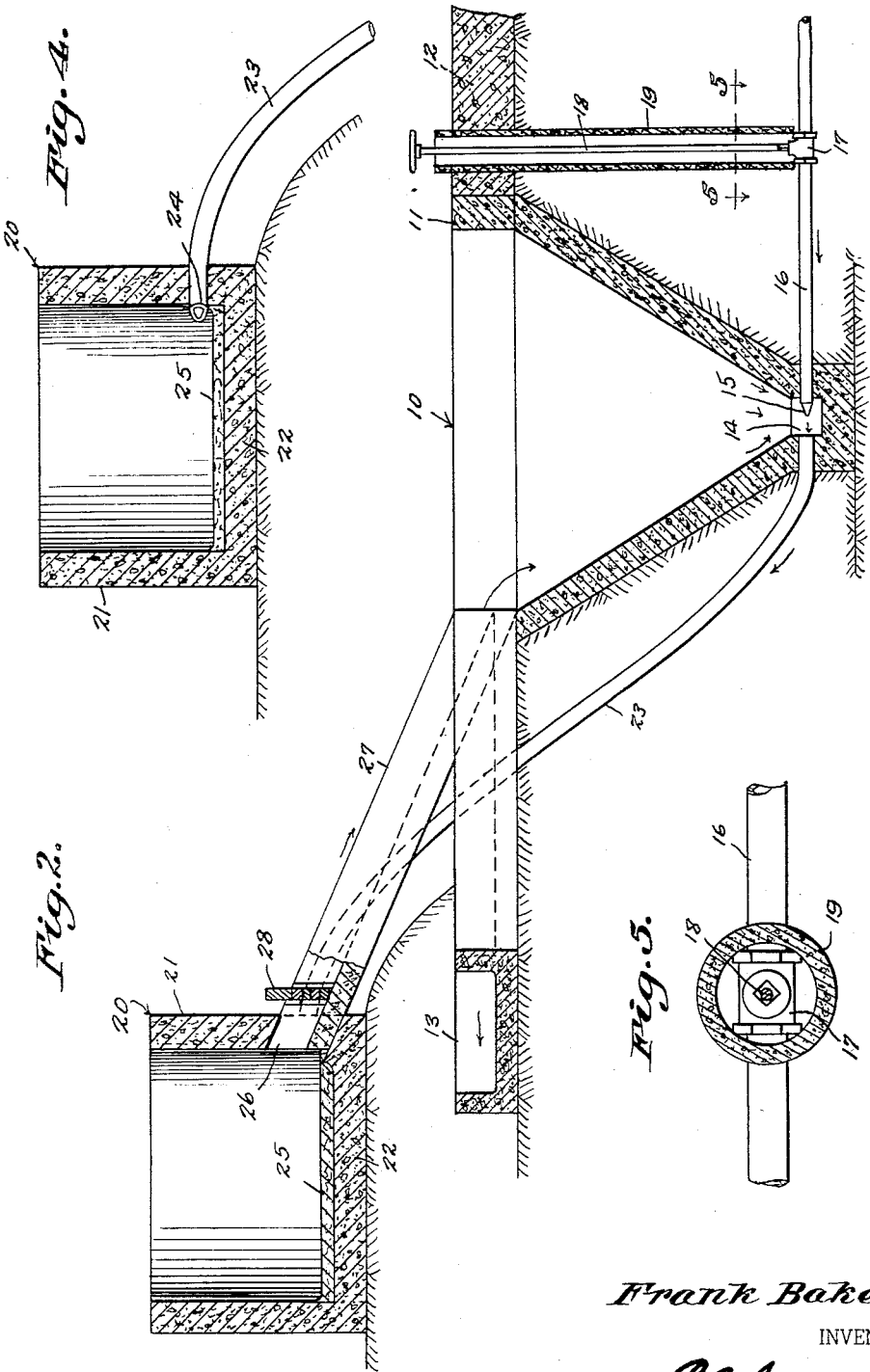
Frank Baker
INVENTOR
BY CASnow&Co.
ATTORNEYS.

United States Patent Office 2,921,684
Patented Jan. 19, 1960

2,921,684
WHIRLPOOL SEPARATOR
Frank Baker, Medical Lake, Wash.
Application October 27, 1955, Serial No. 543,066
1 Claim. (Cl. 210—197)

This invention relates to a whirlpool separator.

An object of this invention is to provide a separator assembly whereby solids may be readily separated from fluids, the process embodying a whirlpool separator tank from which the solids are removed from the fluids.

A further object of this invention is to provide a separator means which includes a settling chamber with a jet pressure means in the bottom of the chamber for forcing the heavy material upwardly into a separator chamber in which the fluid is subjected to a whirlpool action.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a plan view of a whirlpool separator constructed according to an embodiment of this invention.

Figure 2 is a vertical sectional view taken substantially on the line 2—2 of Figure 1.

Figure 3 is a sectional view taken on the line 3—3 of Figure 1.

Figure 4 is a sectional view taken substantially on the line 4—4 of Figure 1.

Figure 5 is a sectional view taken on line 5—5 of Fig. 2.

Referring to the drawings, the numeral 10 designates generally a conical settling tank which is formed with a cylindrical rim 11. An intake trough 12 is adapted to feed into the upper end of the tank 10 and an outlet trough 13 extends from the upper end of the tank 10 oppositely from the trough 12.

The tank 10 is adapted to be embedded in the ground, with the troughs 12 and 13 on substantially ground level. The tank 10 at the lower small end thereof is formed with a cylindrical chamber 14 and a pressure nozzle 15 connected to a liquid pressure line 16 is disposed in the bottom of chamber 14.

The pressure line 16 has a valve 17 interposed therein and an elongated valve stem 18 extends upwardly to a point above the ground level through a concrete pipe or tube 19. A separator tank 20 formed of cylindrical side walls 21 and a bottom wall 22, is disposed at a point above ground level and above the upper end of tank 10.

A fluid conducting pipe line 23 extends from a point confronting the nozzle 15 in chamber 14 to the lower portion of the separator tank 20. The upper end 24 of the fluid conducting line 23 enters the interior of the separator tank 20 on substantially a tangent to the inner surface of the tank 20, as shown in Figure 1, so that the incoming fluid will produce a whirlpool action within the interior of tank 20. The heavy material, such as solids or the like, are adapted to separate out of the liquid in the separator tank 20, the solids being indicated by the numeral 25 in Figure 2.

The tank 20 has an outlet opening 26 in the side wall 21 thereof at a point slightly above the bottom wall 22, so that the liquids may be returned through a return trough 27 to the settling tank 10.

A vertically movable weir valve 28 is disposed across the trough 27 so that the flow of liquid through the trough 27 back to the settling tank 10 may be finely regulated.

As shown in Figure 1, the trough 27 is in communication with settling tank 10 at a point to one side of the axial center of tank 10 on substantially a tangent, so that the returning liquid from separator tank 20 to settling tank 10 will effect a whirling motion to the material including liquids and solids in the settling tank 10.

In the use and operation of this apparatus, the combined material, which includes liquids and solids, is discharged into settling tank 10 from intake or feeding trough 12. Any overflow of liquid will pass from the upper end of tank 10 outwardly through the discharge trough 13. The heavy material discharged in settling tank 10 will drop downwardly into the lower receiving chamber 14 and with valve 17 open, water or other liquid of relatively heavy pressure will force the settled out solids upwardly through pipe 23 into separator tank 20. The entering liquids and solids in tank 20 will be given a whirling motion so that the solids indicated at 25 will drop downwardly in the bottom of tank 20.

After the system has been in operation for a period of time, the solids 25 may be removed from tank 20 by any suitable removing means. The excess liquids in tank 20 will be returned to tank 10 through the return trough 27, with valve or gate 28 disposed in an upper open position.

Having thus described the invention, what is claimed is:

A whirlpool separator comprising a conical settling tank having the small end thereof lowermost, a cylindrical chamber in the lower end of said tank, a separator tank disposed in a plane above said settling tank, a pipe connecting a point slightly above the bottom of said chamber with said separator tank, the upper outlet end of said pipe being disposed substantially on a tangent to the inner surface of said separator tank whereby to effect a circular whirlpool action in said separator tank, a pressure nozzle in said chamber confronting the lower end of said pipe to force the material in said chamber upwardly through said pipe, a pressure pipe to said nozzle, a valve in said pressure pipe, an inclined liquid return trough connected between said separator and settling tanks, a vertically adjustable weir valve across the upper portion of said return trough, an inlet trough discharging into the top of said settling tank, a liquid inlet trough for said settling tank, and a liquid outlet trough extending from the top of said settling tank.

References Cited in the file of this patent

UNITED STATES PATENTS

| | | |
|---|---|---|
| 1,271,925 | Moore | July 9, 1918 |
| 1,272,850 | Robbins | July 16, 1918 |
| 1,642,206 | Imhoff | Sept. 13, 1927 |
| 1,820,976 | Imhoff | Sept. 1, 1931 |
| 1,917,819 | Barr | July 11, 1933 |
| 2,076,529 | Durdin | Apr. 13, 1937 |
| 2,259,029 | Fisher | Oct. 14, 1941 |
| 2,308,670 | Bolton | Jan. 19, 1943 |
| 2,574,685 | Baxter et al. | Nov. 13, 1951 |
| 2,703,748 | Clarke et al. | Mar. 8, 1955 |